United States Patent
Harrington (10) Patent No.: US 8,520,774 B1
(45) Date of Patent: Aug. 27, 2013

(54) GENERATION OF RADIO FREQUENCY OUTPUTS

(75) Inventor: Michael B. Harrington, Cork (IE)

(73) Assignee: Arris Enterprises, Inc., Suwanee, GA (US)

( * ) Notice: Subject to any disclaimer, the term of this patent is extended or adjusted under 35 U.S.C. 154(b) by 31 days.

(21) Appl. No.: 12/977,165

(22) Filed: Dec. 23, 2010

(51) Int. Cl.
*H04L 27/36* (2006.01)

(52) U.S. Cl.
USPC .......................................................... 375/298

(58) Field of Classification Search
USPC ................. 375/298, 261, 268, 271, 279, 281, 375/300, 308, 320, 295; 370/419, 420, 415, 370/463
See application file for complete search history.

(56) References Cited

U.S. PATENT DOCUMENTS

| | | | | |
|---|---|---|---|---|
| 238,116 | A * | 2/1881 | Hicinbothem, et al. | 417/155 |
| 5,285,479 | A * | 2/1994 | Iwane | 375/298 |
| 2003/0151536 | A1* | 8/2003 | Aiura et al. | 341/144 |
| 2003/0185287 | A1* | 10/2003 | Ogawa | 375/211 |
| 2004/0161031 | A1* | 8/2004 | Kwentus et al. | 375/240 |
| 2005/0238116 | A1* | 10/2005 | Monta | 375/298 |
| 2005/0289347 | A1* | 12/2005 | Ovadia | 713/171 |
| 2006/0218593 | A1* | 9/2006 | Afshary et al. | 725/74 |
| 2007/0286234 | A1* | 12/2007 | Gutman et al. | 370/468 |
| 2010/0142598 | A1* | 6/2010 | Murray et al. | 375/219 |
| 2011/0191797 | A1* | 8/2011 | Lee et al. | 725/31 |
| 2012/0076234 | A1* | 3/2012 | Kim et al. | 375/295 |

\* cited by examiner

*Primary Examiner* — Shuwang Liu
*Assistant Examiner* — David Huang
(74) *Attorney, Agent, or Firm* — Troy A. Van Aacken (57) ABSTRACT

Methods, systems, and apparatus can provide a plurality of RF outputs using a single digital to analog convertor (DAC) for digitally modulated data. In various examples, an intermediate frequency (IF) containing one or more digitally modulated channels is frequency down converted to meet the radio frequency (RF) specifications of a communication system.

13 Claims, 7 Drawing Sheets

GENERATION OF RADIO FREQUENCY OUTPUTS

TECHNICAL FIELD

This disclosure relates to the generation of digitally modulated radio frequency (RF) outputs through frequency translation.

BACKGROUND

There has been an industry trend from analog to digital modulation in communication systems. Some of the benefits of digital modulation include more robust communication, ability to introduce security through encryption/de-encryption, the ability to multiplex multiple forms of data (e.g., data, voice, video . . . ) and lower implementation costs, among others.

Digital modulation can be used to transfer digital serial data over an RF passband waveform. Digital modulation techniques include, but are not limited to, quadrature phase shift keying (QPSK), frequency shift keying (FSK), minimum shift keying (MSK) and quadrature amplitude modulation (QAM). Digital modulation is used in wireless and wired communication systems. Cellular, satellite, terrestrial and broadband cable systems represent communication systems implementing digital modulation.

A digital to analog convertor (DAC) or an equivalent channel generation device is used to convert serial digital data for transmission in communication systems with an RF passband waveform. The serial digital data is sampled and converted to an intermediate frequency (IF) waveform at a rate identified based on the Nyquist theorem. A byproduct of the sampling process and the physical implementation is often the generation of in-band and/or out-of-band noise in the RF waveform. Noise, spurious emissions, harmonics and other characteristics may be introduced when the generation of the RF passband waveform does not meet the RF specifications of the communication system. These effects can result in limiting the utilization of any channel in the RF passband, and/or additional circuitry may be introduced to meet the RF specifications of the communication system.

BRIEF DESCRIPTION OF THE DRAWINGS

Like reference numbers and designations in the various drawings indicate like elements.

DETAILED DESCRIPTION

In some implementations of this disclosure, systems and methods can operate to use a DAC (Digital to Analog Convertor) or equivalent device to generate an IF waveform for frequency translation resulting in one or more RF outputs for transmission in an RF passband communication system. In various implementations, DACs used in this system can be obtained from Analog Devices, Inc. of Norwood, Mass., and Maxim Integrated Products, Inc. of Sunnyvale, Calif.

Figure 1:
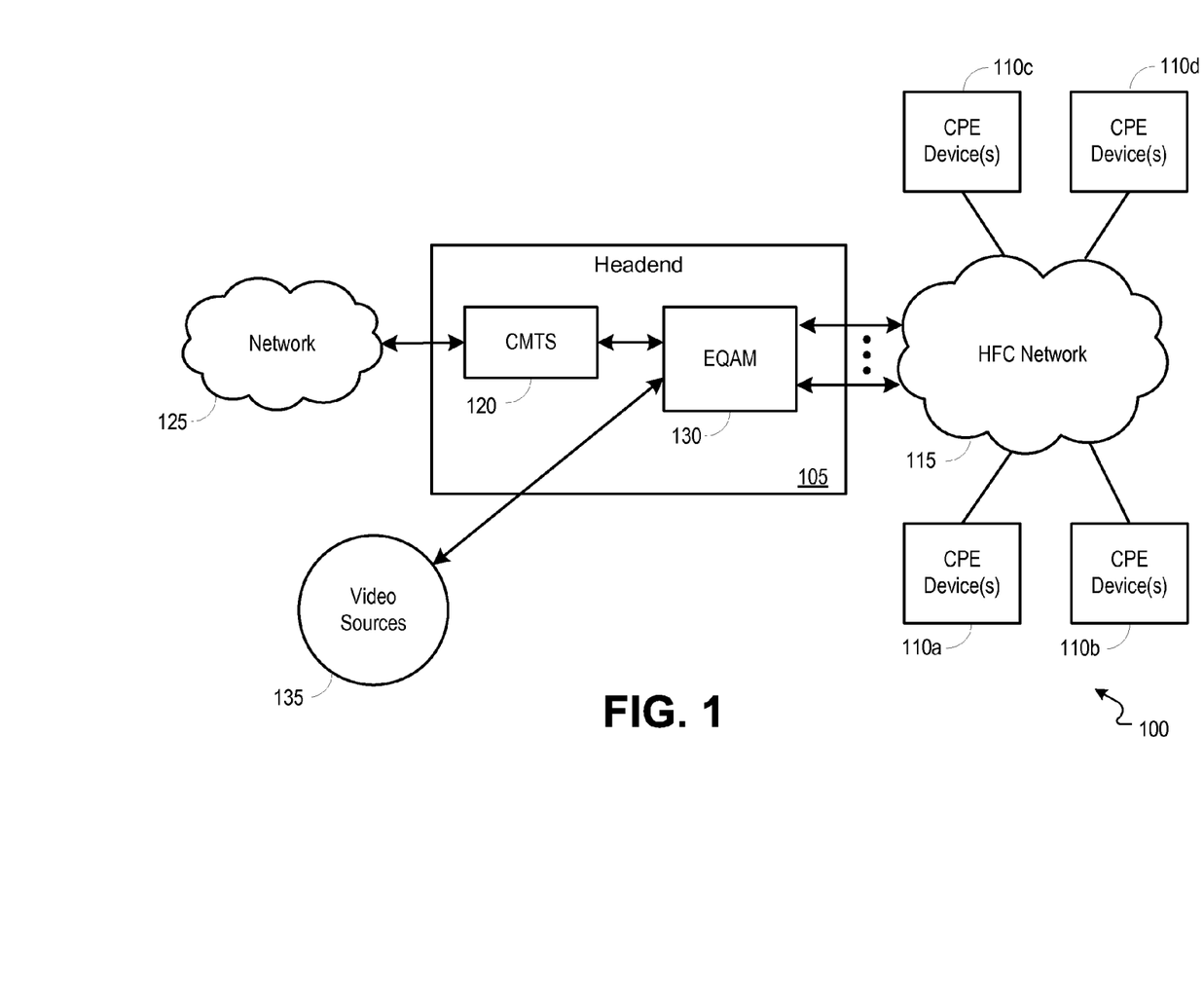
FIG. 1 is a block diagram illustrating an exemplary network environment operable to provide plurality of RF outputs for transmission in a communication system.

FIG. 1 is a block diagram illustrating an exemplary network environment operable to provide a plurality of RF outputs. In some implementations, a headend 105 can provide video, data and/or voice service(s) to customer premise equipment (CPE) devices 110a-d in one or more subscriber groups (e.g., service group(s)) through a hybrid fiber-coax (HFC) network 115. The headend 105 can include devices such as a cable modem termination system (CMTS) 120 and/or one or more edge quadrature amplitude modulation (EQAM) device(s) 130, or a combined device including multiple edge and/or video or data processing functionalities. Such devices can operate to facilitate communications between a network 125, digital video source(s) 135 and the CPE devices 110a-d. In various implementations, the network 125 and digital video source(s) 135 can include one or more networks internal to the headend and/or one or more networks external to the headend (e.g., one or more extranets, the Internet, etc.).

Data services can be handled by the headend 105 through a CMTS 120. The CMTS 120 can receive data signals from external device(s) or nodes through network(s) 125. The network(s) 125, for example, can operate using Internet protocol (IP), sending data packets to and receiving data packets from the headend 105. In some examples, the CMTS 120 can be paired with a SIP proxy server (not shown) operable to provide voice over internet protocol (VoIP) services with voice connectivity to other subscribers or voice connectivity to a public switched telephone network (PSTN) (not shown). Video services can be handled by the headend 105 through EQAM 130. The EQAM 130 can receive data signals through digital video source(s) 135. The video source, for example, can be in the form of IP MPEG transport streams generated by video streaming applications (e.g., Video on Demand).

In some implementations, the CMTS 120 and digital video source 135 can forward packets destined for subscribers to EQAM device 130 used to modulate the digital signals and generate one or more channels on one or more RF outputs. The RF output(s) can include, but is not limited to, data, voice and video streams for transmission to a combiner (not shown), which can combine multiple RF outputs onto a single fiber for transmission to one or more CPE devices 110a-d via the hybrid fiber-coax (HFC) network 115. In other implementations, the CMTS 120 can modulate a digital data stream for conversion to an RF output connected to a combiner for transmission in (HFC) network 115.

Figure 2:
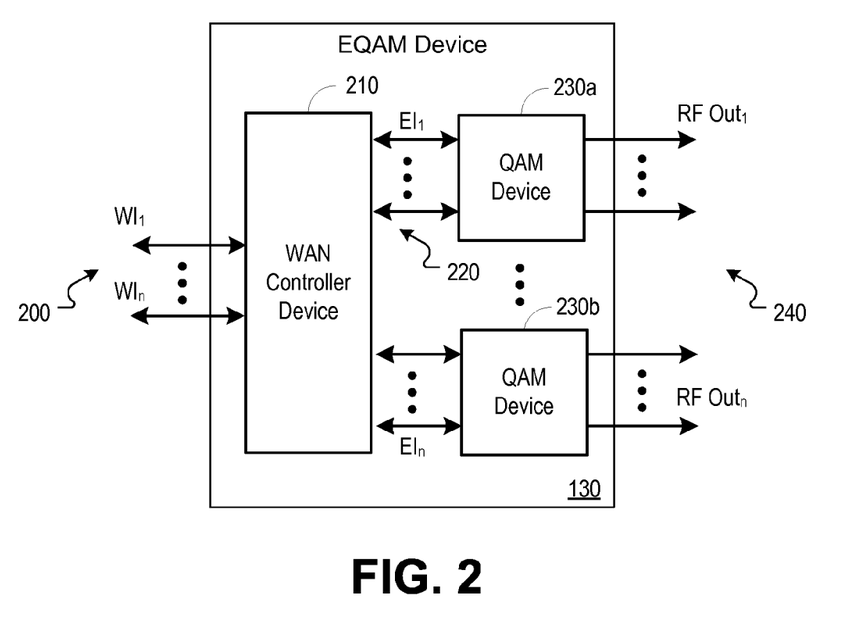
FIG. 2 is a block diagram illustrating an edge quadrature amplitude modulation (EQAM) device with plurality of RF outputs.

FIG. 2 is a block diagram illustrating one implementation of an EQAM device 130. The EQAM device 130 and/or elements provided within can be used in wired or wireless communication systems. While the EQAM device 130 is based on QAM, other forms of digital modulation methods can be implemented. The EQAM device 130 can reside in a headend 105, wireless base station, and/or can be distributed elsewhere in the communication system. Some implementations can include an EQAM device 130, and/or elements of, in a fiber node (not shown) of an HFC network (e.g., HFC network 115 of FIG. 1).

The EQAM device 130 can include one or more wide area network (WAN) interface(s) 200 (WI1-WIn) and can receive data, voice and video digital data streams. The EQAM device 130 can provide one or more RF Output(s) 240 (RF Out1-RF Outn). Each RF Output can contain one or more QAM channels. Implementation of the WAN interface(s) 200 can be copper or fiber based gigabit ethernet. The WAN interface(s) 200 is/are not limited to gigabit ethernet and can support other data rates (e.g., 10-gigabit) and/or other interfaces and protocols such as, but not limited to, gigabit passive optical network (GPON).

The WAN controller (210) can be operable to implement the specifications of the WAN interface(s) 200 which can include physical, link, network, transport and application layer components. The EQAM device 130 can include one or more QAM based modulators 230a and 230b. The WAN controller 210 can direct unicast digital data streams received from WAN interface(s) 200 to one of the QAM modulators 230 and multicast streams to one or more QAM modulators 230a and 230b through Ethernet interface(s) 220 (EI1-EIn). The Ethernet interface(s) 200 is/are not limited to gigabit ethernet and can support other data rates (e.g., 10-gigabit) and/or other interfaces and protocols. The one or more QAM modulators 230a and 230b can direct data streams to one or more QAM channel(s) provided by one or more RF Output(s) (RF Out1-RF Outn).

Figure 3:
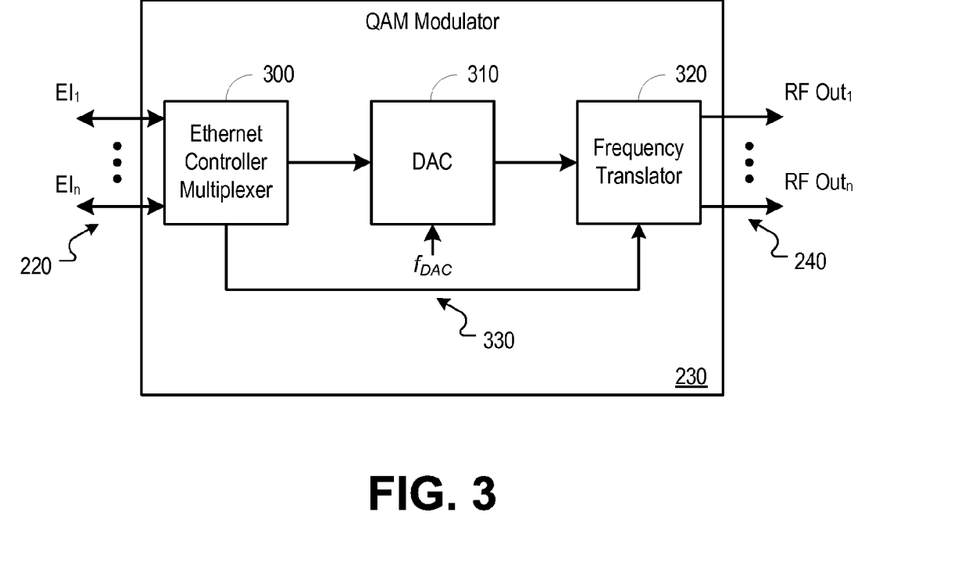
FIG. 3 is a block diagram illustrating a quadrature amplitude modulation (QAM) device with plurality of RF outputs.

FIG. 3 is a block diagram illustrating one implementation of a QAM modulator 230. The QAM modulator 230 can include one or more ethernet interface(s) 220 (EI1-EIn) and can receive data, voice and video digital data streams. The QAM modulator 230 can provide one or more RF Output(s) 240 (RF Out1-RF Outn) with a single DAC 310.

The QAM modulator 230 can contain an ethernet controller multiplexer 300. The ethernet controller multiplexer 300 implements the specifications of the ethernet interface(s) 220 (EI1-EIn) which may include physical, link, network, transport and application layer specifications. The multiplexer can direct data streams for digital QAM modulation to one or more channel(s) for synthesis by DAC 310. The modulator 230 can also provide a frequency translator 320 with one or more local oscillator settings through interface 330. The local oscillator settings can provide the frequency translator 320 with one or more RF center frequency(s) for one or more RF outputs 240.

The QAM modulator 230 can also contain a DAC 310 or equivalent channel generation circuitry. The DAC 310 can accept one or more digital modulated signal(s) for conversion to an analog IF waveform. The DAC 310 can sample the digital modulated signals at a frequency fDAC, greater than the maximum frequency of the RF passband waveform transmitted, illustrated as fc in FIGS. 5a and 5b, on RF outputs 240.

Figure 4:
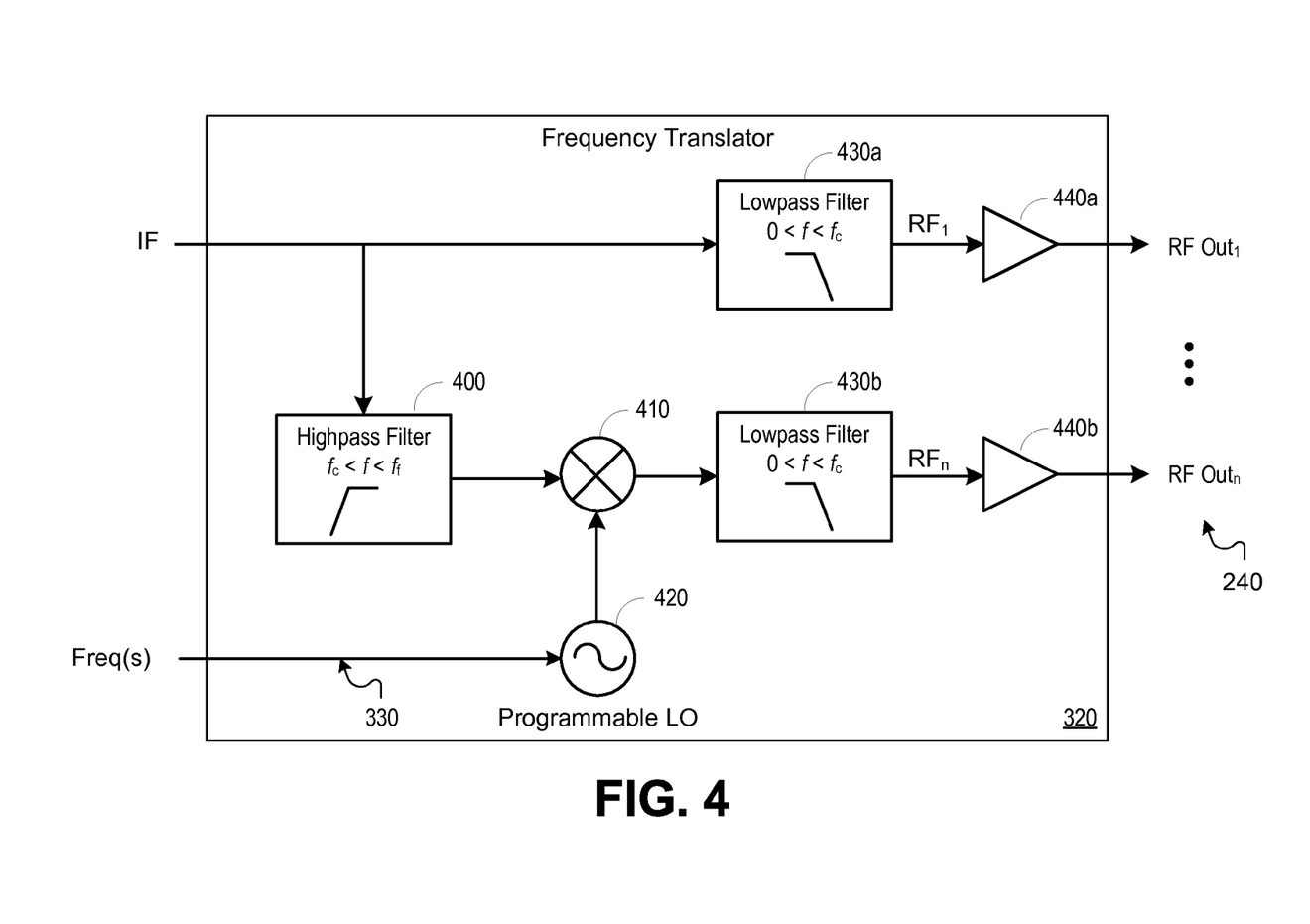
FIG. 4 is a block diagram illustrating one implementation of a frequency distribution device with plurality of RF outputs.
Figure 5A:
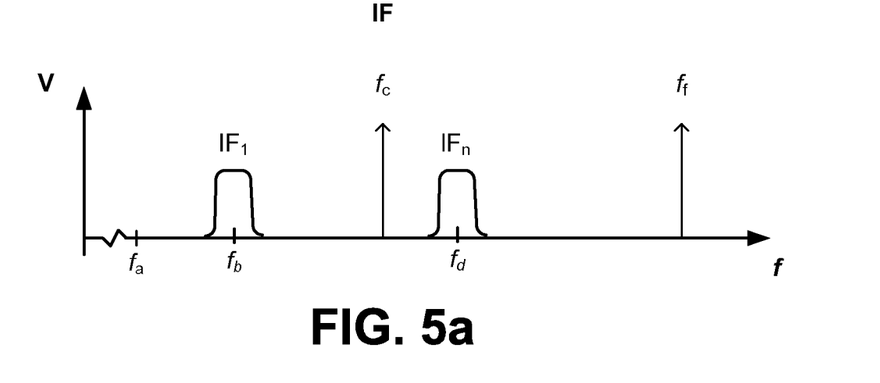
FIG. 5a and FIG. 5b are frequency domain graphs of IF (intermediate frequency) and RF (radio frequency) for the frequency distribution device illustrated in FIG. 4.

FIG. 4 is a block diagram illustrating one implementation of frequency translator 320. The frequency translator 320 can receive an IF waveform from DAC 310. Given an RF passband with a starting frequency of fa and an ending frequency of fc, the DAC 310 can generate one or more QAM channels anywhere in the RF passband from a frequency of fa to fc and satisfy the RF Output(s) 240 specifications of the communication system. One or more QAM channels operable to satisfy the specifications are illustrated in FIG. 5a as fb and RF1 in FIG. 5b and thereby can be used directly (e.g., no frequency up or down conversion) for RF output(s) 240. For this case the frequency translator 320 uses the IF waveform directly using a low-pass filter 430a to attenuate RF signals above the RF passband fc and amplifier 440a to produce RF output(s) 240.

Figure 5B:
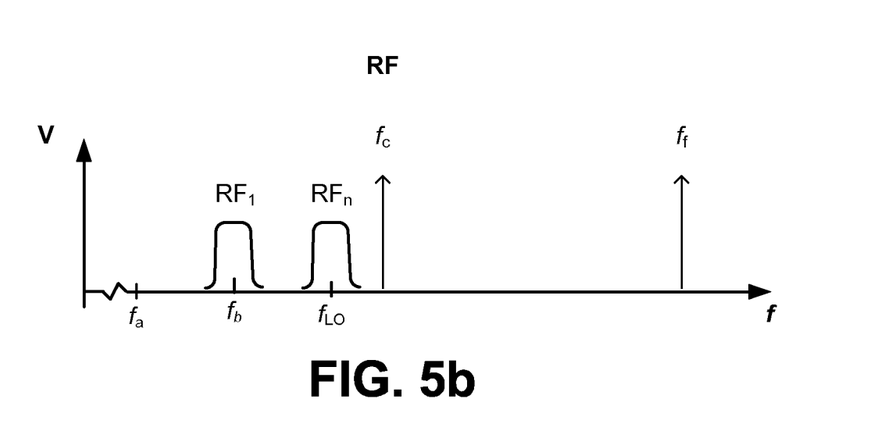

The DAC 310 can generate noise, spurious emissions, harmonics and other characteristics that can be introduced in the synthesis of the digital modulated input to an analog IF waveform not meeting the RF specifications of the communication system. These characteristics can limit the use of one or more QAM channels to be used directly for RF Output(s) 240 as illustrated in FIG. 5b as one or more QAM channels at a frequency fLO.

Referring to FIG. 5a, DAC 310 can be operable to provide synthesis of digital modulated signals at frequencies greater than the RF passband as illustrated in FIG. 5a from a frequency range fc to ff that can be frequency down converted and meet the RF specifications of the communication system based on the fact that quantization noise power is lower per Hz (hertz) with a higher fDAC frequencies. For this case, referring back to FIG. 4, frequency translator 320 can use highpass filter 400 to attenuate IF signals in the IF passband, fa to fc and mixer 410 to down convert the frequency fd in FIG. 5a to frequency fLO as illustrated in FIG. 5b. The output of the mixer 410 can be fed through lowpass filter 430b (e.g., to attenuate RF signals above the RF passband fc) and amplifier 440b to produce RF Output(s) 240. A programmable local oscillator 420 can be used as an input to mixer 410 providing configurability for the center frequency fLO for one or more QAM channels.

Figure 6:
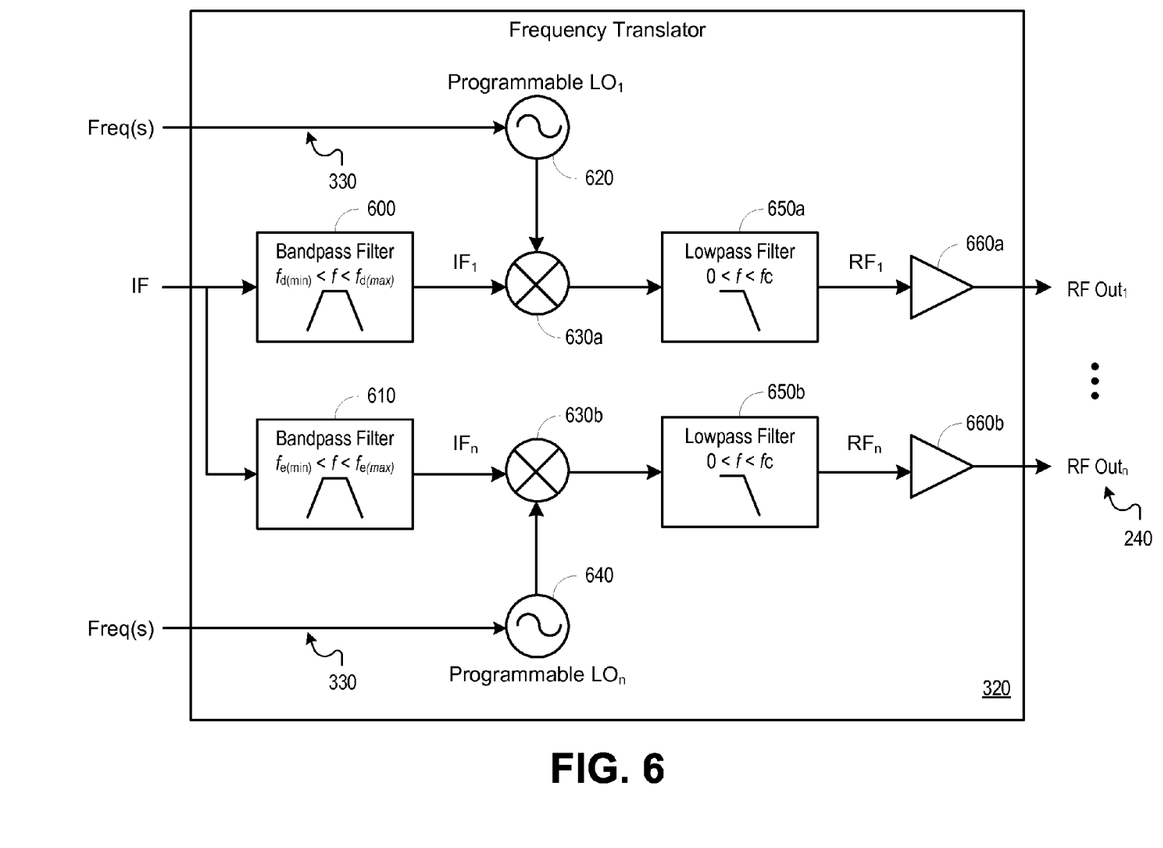
FIG. 6 is a block diagram illustrating another implementation of a frequency distribution device with plurality of RF outputs.
Figure 7A:
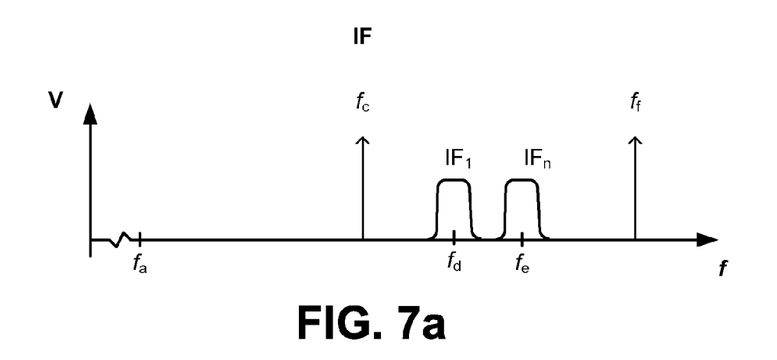
FIG. 7a and FIG. 7b are frequency domain graphs of IF and RF for the frequency distribution device illustrated in FIG. 6.
Figure 7B:
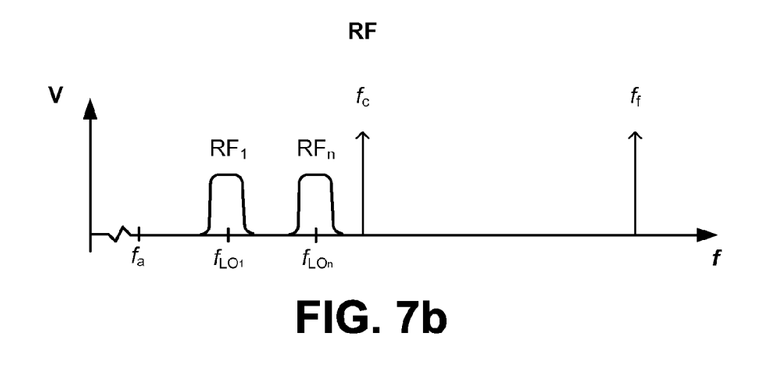

FIG. 6 represents another implementation of frequency translator 320 where the DAC 310 is not capable of generating an IF waveform that can be directly applied to RF Output(s) 440a and 440b and meet the RF specifications of the communications system. This implementation is based on the DAC 310 being capable of synthesis of digital modulated signals at frequencies greater than the RF passband as illustrated in FIG. 6a from a frequency range fc to ff that can be frequency down converted and meet the RF specifications of the communication system based on the fact that quantization noise power is lower per Hz (hertz) with a higher fDAC frequency. For this case, referring back to FIG. 6, frequency translator 320 can use bandpass filters 600 and 610 to attenuate the IF waveform at frequencies above and below one or more QAM channels with a IF center frequency of fd and fe as identified in FIG. 7a respectively. Mixers 630a and 630b are used to down convert IF1 and IF2 to RF1 and RF2 with the RF passband defined by the communication system as illustrated in FIG. 7b. The output of the mixers 630a can be fed through lowpass filter 650a to attenuate RF signals above the RF passband fc and amplifier 660a to produce RF Output(s) 240. The output of the mixer 630b is fed through lowpass filter 650b (e.g., to attenuate RF signals above the RF passband fc) and amplifier 660b to produce RF Output(s). Programmable local oscillators 620 and 640 can be used as an input to mixers 630a and 630b providing configurability for the center frequencies fLO1 and fLOn for one or more QAM channels.

The frequency translator 320 and/or elements are not limited to implementation in an EQAM device. Frequency translator 320, and/or elements of, may be implemented in a CMTS (e.g., CMTS 120 of FIG. 1), and distributed in an HFC network (e.g., HFC network 115) or a wireless base station communication. Furthermore, the frequency translator 320 is not constrained for use with only QAM modulation methods and techniques but may be implemented with other forms of digital modulation methods and techniques.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system, comprising:
   a digital analog convertor (DAC) operable to synthesize a plurality of groups of one or more digitally modulated channels;
   the DAC further operable to synthesize the plurality of groups of the one or more digitally modulated channels at frequencies within and greater than the RF passband of a communication system;
   a frequency translator operable to generate a plurality of physical RF outputs by downconverting the one or more groups of the one or more digitally modulated channels synthesized at frequencies greater than the RF passband of the communication system to frequencies within the RF passband of the communication system,
   wherein the frequency translator generates the plurality of physical outputs from the downconverted one or more groups of the one or more digitally modulated channels,
   wherein each physical RF output is associated with one of the groups of the one or more digitally modulated channels.

2. The system of claim 1, wherein one of the plurality of groups of the one or more digitally modulated channels are synthesized at frequencies within the RF passband of the communication system.

3. The system of claim 1, wherein the frequency translator comprises one or more mixers and one or more filters operable to down convert and condition the one or more of the plurality of groups of the one or more digitally modulated channels synthesized at frequencies greater than the RF passband of the communication system.

4. The system of claim 1, wherein the system is implemented by an edge quadrature amplitude modulation (EQAM) device.

5. The system of claim 1, wherein the communication system is implemented by a wired network to communicate with one or more customer premise equipment (CPE) devices.

6. The system of claim 5, wherein the wired network is a hybrid fiber-coax network.

7. A method, comprising:
   receiving a first group of one or more digitally modulated channels;
   synthesizing the first group of the one or more digitally modulated channels at frequencies within the RF passband of a communication system;
   generating a RF physical output from the synthesized first group of the one or more digitally modulated channels; and
   receiving one or more groups of the one or more digitally modulated channels different from the first group;
   synthesizing the one or more groups of the digitally modulated channels different from the first group at frequencies greater than the RF passband of the communication system;
   down converting the synthesized one or more groups of the digitally modulated channels different from the first group at frequencies greater than the RF passband to frequencies within the RF passband of a communication system; and
   generating one or more RF physical outputs associated with the down converted one or more groups of the digitally modulated channels.

8. The method of claim 7, wherein the digitally modulated channels are modulated using quadrature amplitude modulation (QAM).

9. The method of claim 7, wherein the digitally modulated channels comprise one of video, data and voice information.

10. A system, comprising:
    a digital analog convertor (DAC) operable to synthesize a plurality of groups of one or more digitally modulated channels;
    the DAC further operable to synthesize the plurality of groups of one or more digitally modulated channels at frequencies greater than the RF passband of a communication system;
    a frequency translator operable to generate a plurality of physical RF outputs by downconverting the one or more groups of the one or more digitally modulated channels synthesized at frequencies greater than the RF passband of the communication system to frequencies within the RF passband of the communication system,
    wherein the frequency translator generates the plurality of physical outputs from the downconverted one or more groups of the one or more digitally modulated channels,
    wherein each physical RF output is associated with one of the groups of the one or more digitally modulated channels.

11. The system of claim 10, wherein the frequency translator comprises one or more mixers and one or more bandpass filters operable to down convert and condition one or more of the plurality of groups of one or more digitally modulated channels synthesized at frequencies greater than the RF passband of the communication system.

12. The system of claim 10, wherein the communication system is implemented by a wireless network to communicate with one or more customer premise equipment (CPE) devices.

13. The system of claim 12, wherein the wireless network comprises a cellular network.

* * * * *